Nov. 26, 1935.                     D. H. PRICE                        2,022,008
                                  POLE SUPPORT
                              Filed Aug. 17, 1934                2 Sheets-Sheet 1
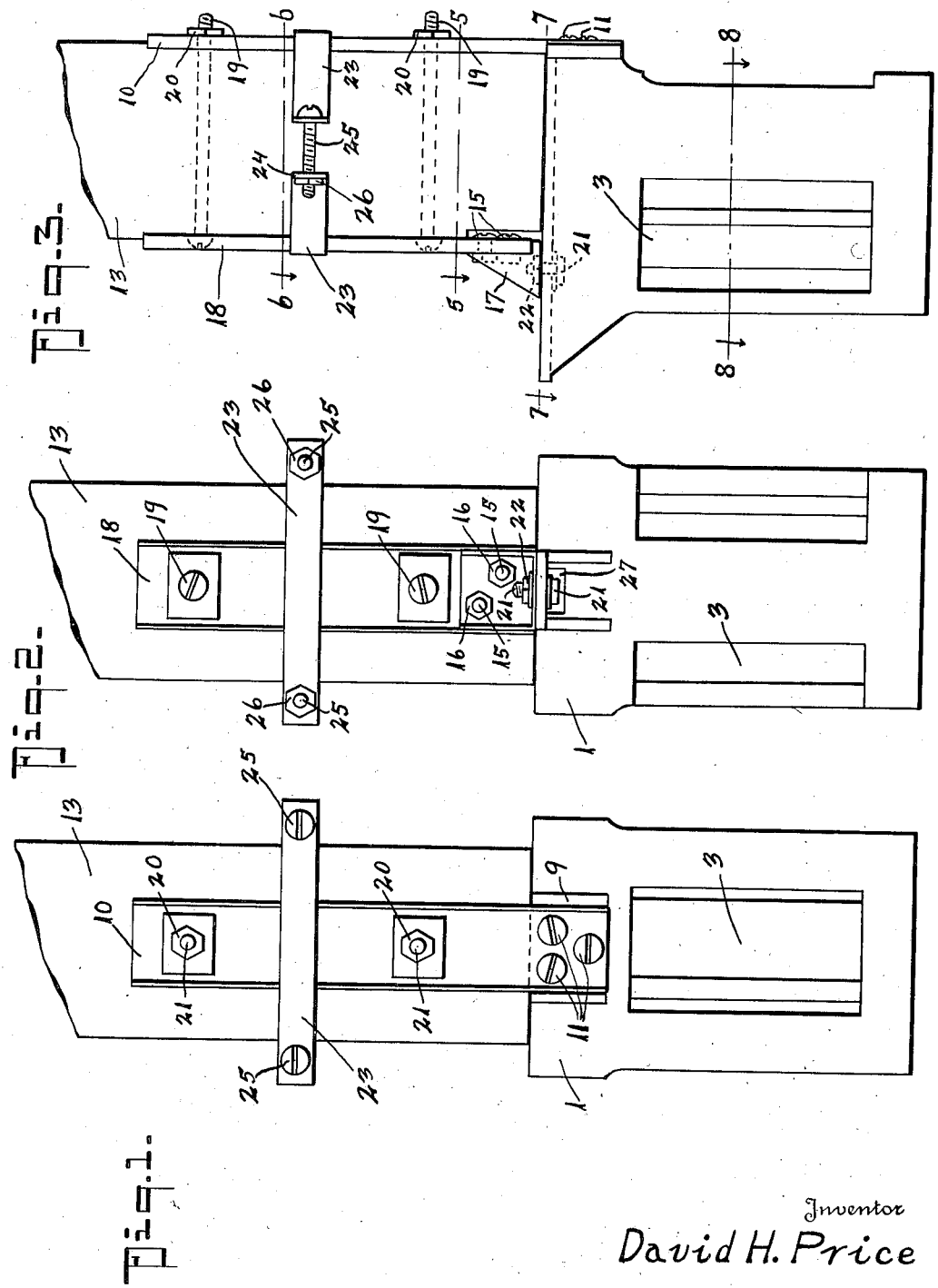
Inventor
David H. Price
By Albert E. Dieterich
Attorney Nov. 26, 1935.  D. H. PRICE  2,022,008
POLE SUPPORT
Filed Aug. 17, 1934   2 Sheets-Sheet 2
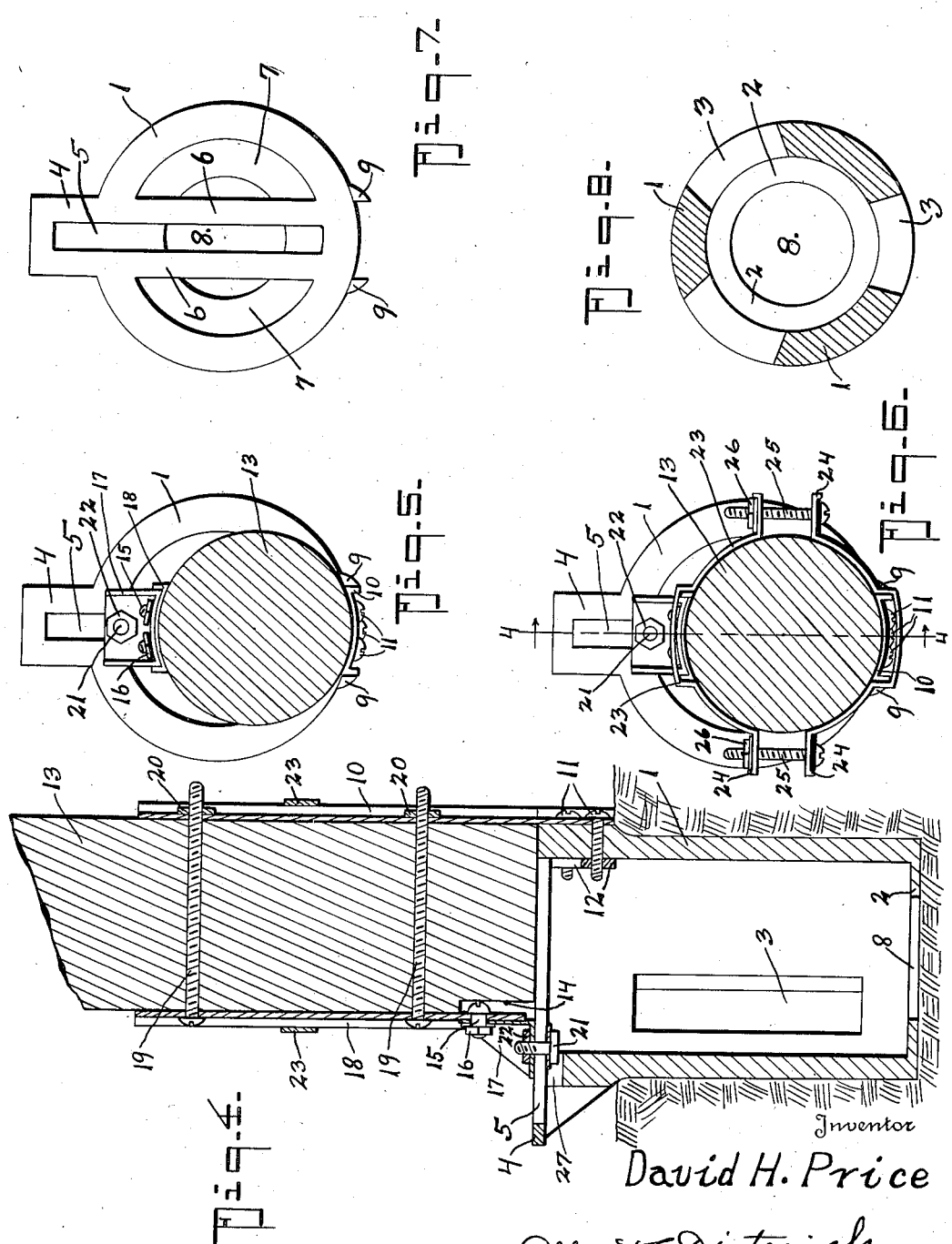
Inventor
David H. Price
By Albert E. Dieterich
Attorney Patented Nov. 26, 1935

2,022,008

UNITED STATES PATENT OFFICE 2,022,008

POLE SUPPORT

David Henry Price, Tyrone, Pa., assignor of forty-five per cent to William Fuoss, Tyrone, Pa.

Application August 17, 1934, Serial No. 740,340

3 Claims. (Cl. 189—28)

My invention relates to improvements in pole bases, the object of the invention being to provide a device which makes it possible to extend the useful life of poles many years after they have rotted below the surface of the ground.

A further object of my invention is to provide an improved device which is simple in construction and easy to apply, and which is so constructed that it will hold poles of various sizes.

Another object of the invention is to provide a base which is so constructed that no support is needed for it other than the ground in which it is set.

Other objects will in part be obvious and in part be pointed out hereinafter.

To the attainment of the aforesaid objects and ends the invention still further resides in the novel details of construction, combination and arrangement of parts, all of which will be first fully described in the following detailed description and then be particularly pointed out in the appended claims, reference being had to the accompanying drawings, in which:—

Figure 1 is a rear elevation of my invention as applied to a pole.

Figure 2 is a front elevation thereof.

Figure 3 is a side elevation of the same.

Figure 4 is a vertical section of the invention, as applied to a pole and is taken on the line 4—4 of Figure 6.

Figure 5 is a cross section taken on the line 5—5 of Figure 3.

Figure 6 is a cross section taken on the line 6—6 of Figure 3.

Figure 7 is a cross section taken on the line 7—7 of Figure 3.

Figure 8 is a cross section on the line 8—8 of Figure 3.

In the drawings, in which like numerals of reference indicate like parts in all of the figures, 1 represents the pole base which is hollow and which has a flange 2 at its bottom extremity, leaving an opening 8. The tubular body 1 has cut-away portions 3 in its vertical sides to allow the dirt, which supports it, to be tamped in. The base 1 has a radial extension 4 which is slotted as at 5, the slot extending across the top of the base 1 through the cross bar 6.

The base 1 has openings in its top which are indicated by the numeral 7 through which the dirt may be tamped to form a support for said base.

9 designates the flanges on the base 1 which support the upright brace 10, said brace being bolted at 11 and secured by the nuts 12.

The pole is indicated by 13 and it has a cut-out portion 14 which provides room for the bolts 15 which secure the supporting adjustable brace 17 by the nuts 16 to the upright pole brace 18.

The supporting adjustable brace 17 is securely held in a fixed position by the bolt 21 which passes through the slotted way 5 and is secured by the nut 22. The pole base 1 has a cut out portion 27 to allow the bolt 21 to pass.

19 designates the bolts which pass horizontally through the upright pole brace 18, through the pole 13 and through the upright brace 10, and are then secured by the nuts 20.

The numeral 23 indicates a two-piece auxiliary clamp which is flanged at 24, the two pieces being drawn together by taking up on the nuts 26 on the bolts 25.

The upright pole braces 10 and 18 are preferably rounded to conform to the shape of the pole, as is also the auxiliary clamp 23 which encircles the upright pole braces 10 and 18.

In using my invention the pole is cut off slightly above the ground level and after the rotted portion of the pole has been extracted from the hole the pole base 1 is placed in the hole and the dirt is then tamped around it. This forces the dirt through the openings 3 in the sides of the pole base 1 to fill the hollow inside of the pole base. The dirt may also be tamped through the holes 7 in the top of the pole base.

The pole base is, in the procedure of tamping in the dirt, lined up with the pole 13, which is temporarily supported by guy poles. The pole brace 10 is then secured by the bolts 11 and nuts 12, after which the pole brace 18 is placed and securely fastened to the supporting brace 17 by the bolts 15 and nuts 16, and the supporting brace 17 is made fast to the cross bars 6. The bolts 19 are then passed clear through the pole and the two pole braces and made secure by the nuts 20.

Thus a pole that has rotted below the ground is made useful for many more years. The auxiliary clamp may be used where necessary because of the wind or other adverse elements.

From the foregoing description it is thought that the construction, advantages and manner of using my invention will be clear to those skilled in the art.

While I have shown a preferred embodiment of the invention, it is obvious that changes in the details of the invention may be made without departing from the spirit thereof or the scope of the appended claims.

What I claim is:

1. A device of the character described comprising a hollow tubular body having openings in its walls, said body having an integral radial extension at the top and an integral cross bar across the top in line with said radial extension, said extension and said cross bar having a slot extending across a diameter of said tubular body, the side wall of said tubular body adjacent said radial extension and beneath the slot therein having a transverse slot, a vertically extending brace secured to the side wall of said tubular body opposite said radial extension, an adjustable vertically disposed brace secured to the top of said tubular body by a bolt and nut passing through said first mentioned slot, said second mentioned slot serving as a passage for the head of said bolt, and means to secure a pole between and to said vertically extending braces, the pole resting endwise on said tubular body and said cross bar.

2. A device of the character described comprising a hollow tubular body having openings in its walls, said body having an integral radial extension at the top and an integral cross bar across the top in line with said radial extension, said extension and said cross bar having a slot extending across a diameter of said tubular body, the side wall of said tubular body adjacent said radial extension and beneath the slot therein having a transverse slot, a vertically extending brace secured to the side wall of said tubular body opposite said radial extension, an adjustable vertically disposed brace secured to the top of said tubular body by a bolt and nut passing through said first mentioned slot, said second mentioned slot serving as a passage for the head of said bolt, and means to secure a pole between and to said vertically extending braces, the pole resting endwise on said tubular body and said cross bar, said means comprising bolts passing through said vertically extending braces and through the pole.

3. A device of the character described comprising a hollow tubular body having openings in its walls, said body having an integral radial extension at the top and an integral cross bar across the top in line with said radial extension, said extension and said cross bar having a slot extending across a diameter of said tubular body, the side wall of said tubular body adjacent said radial extension and beneath the slot therein having a transverse slot, a vertically extending brace secured to the side wall of said tubular body opposite said radial extension, an adjustable vertically disposed brace secured to the top of said tubular body by a bolt and nut passing through said first mentioned slot, said second mentioned slot serving as a passage for the head of said bolt, means to secure a pole between and to said vertically extending braces, the pole resting endwise on said tubular body and said cross bar, said vertically extending braces being of channel form in cross section with their channelled openings disposed away from the pole, said last named means including a split clamp encircling the pole and said braces and recessed to fit over said braces.

DAVID HENRY PRICE.